Figure 1:
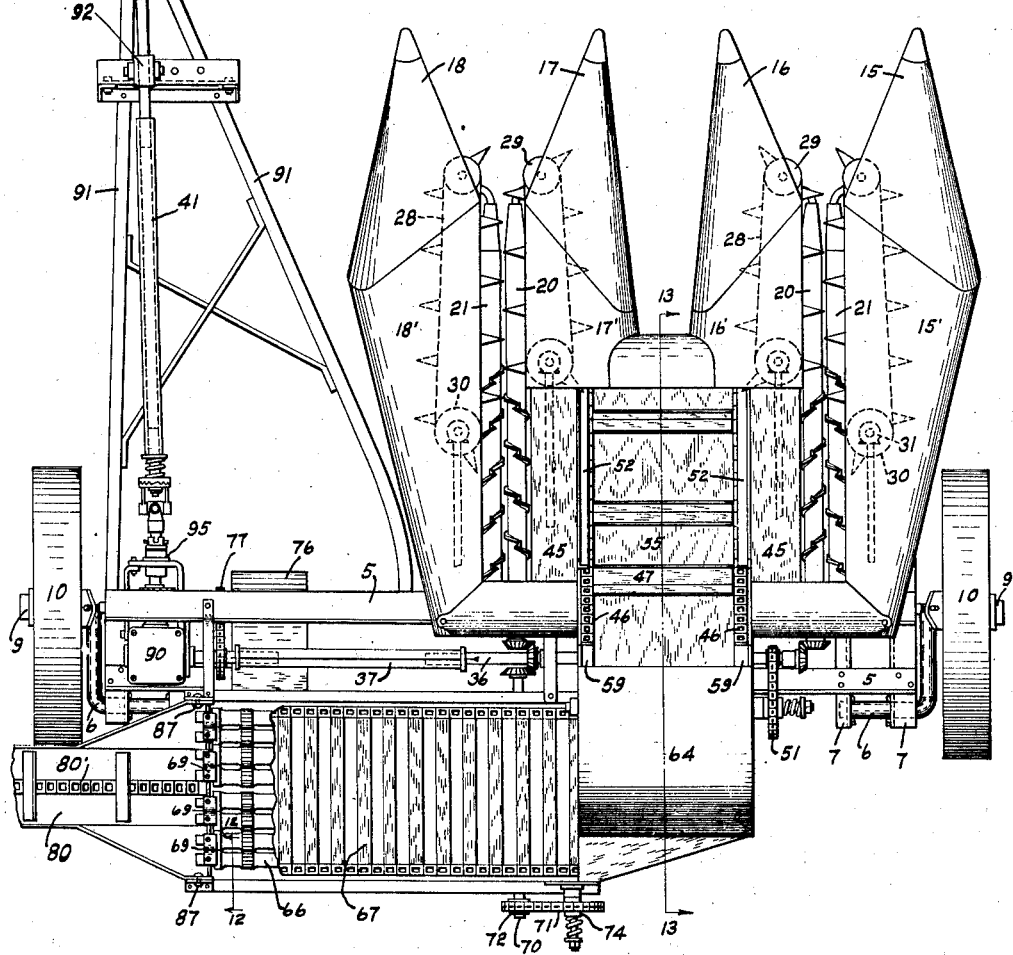

Aug. 15, 1933.  N. R. KRAUSE  1,922,375
CORN HARVESTING MACHINE
Filed Aug. 29, 1932   5 Sheets-Sheet 1

INVENTOR.
NORMAN R. KRAUSE
BY James C. Walsh
ATTORNEY

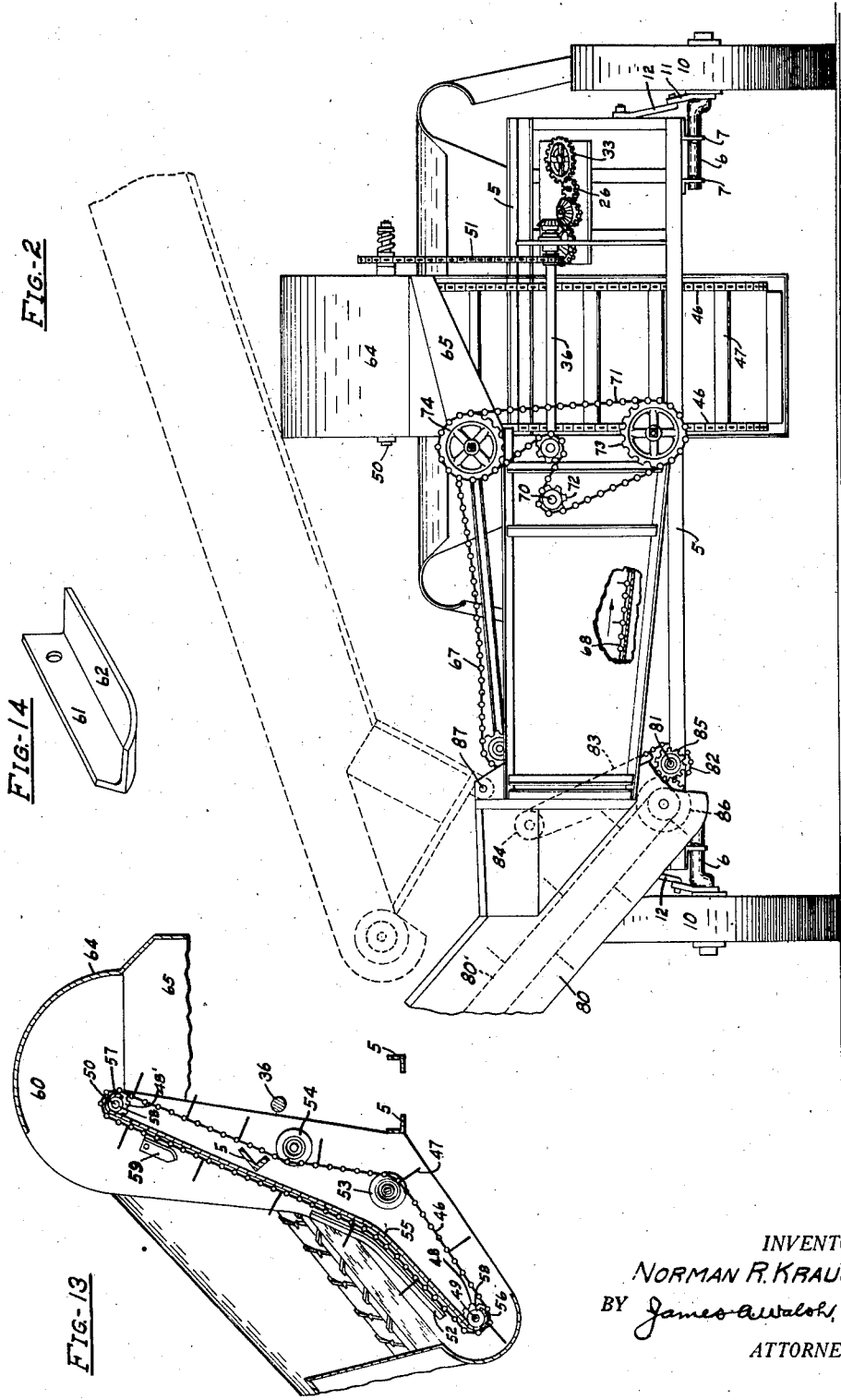

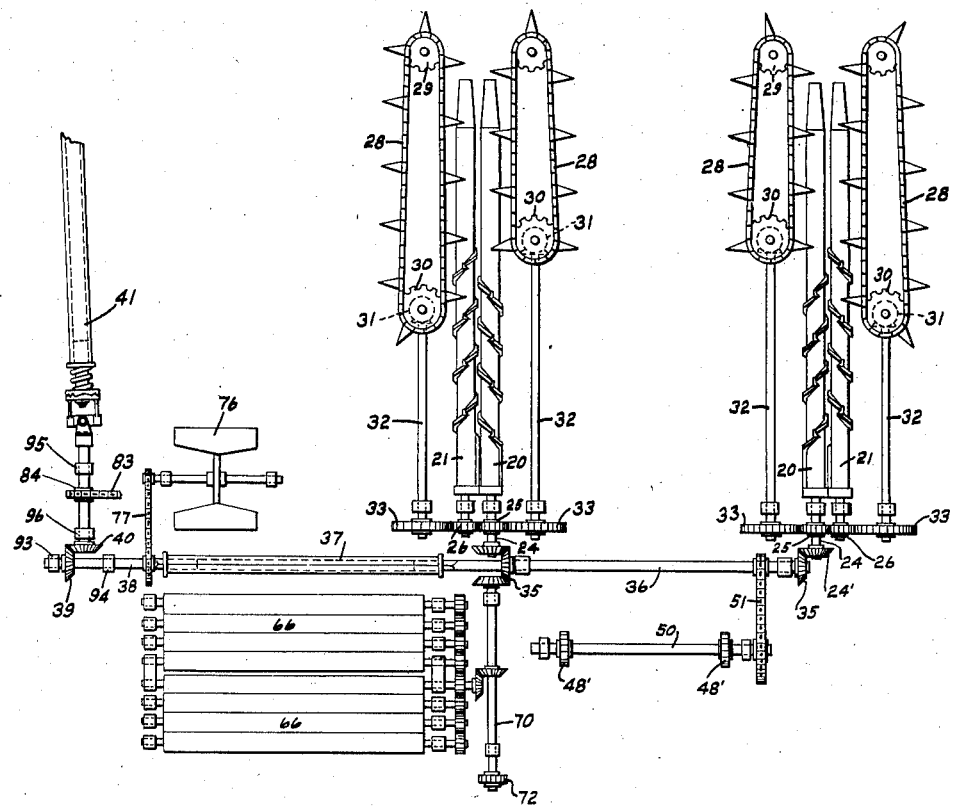
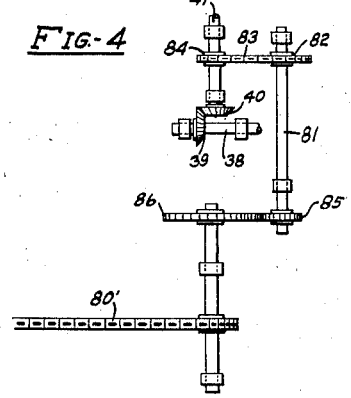
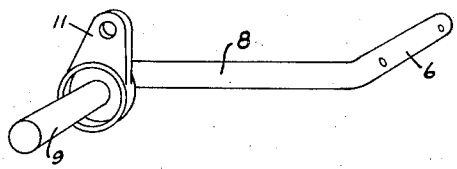

Aug. 15, 1933.     N. R. KRAUSE     1,922,375
CORN HARVESTING MACHINE
Filed Aug. 29, 1932     5 Sheets-Sheet 4
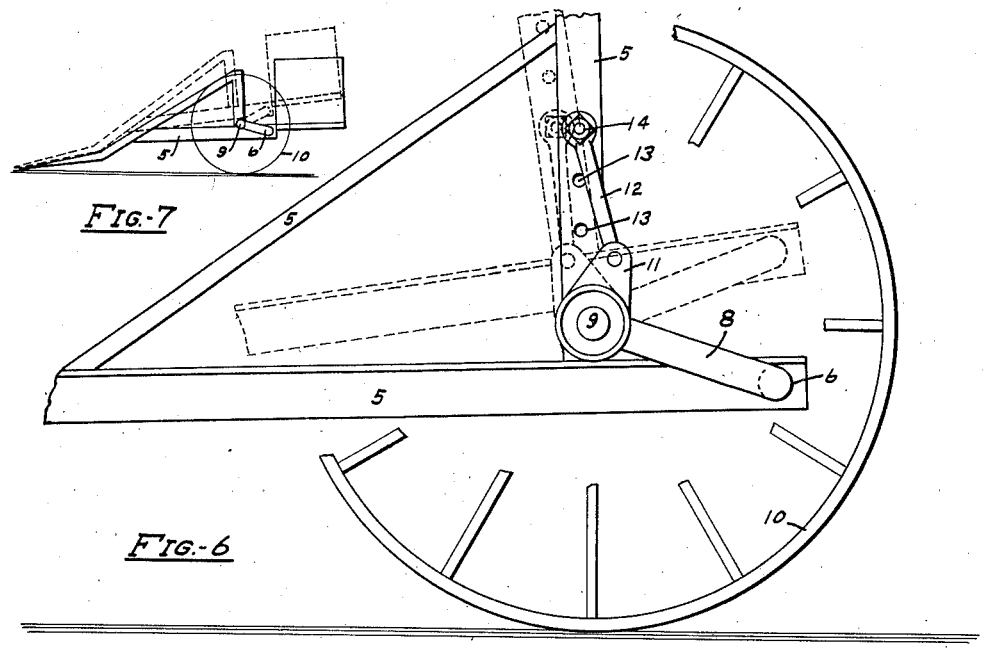
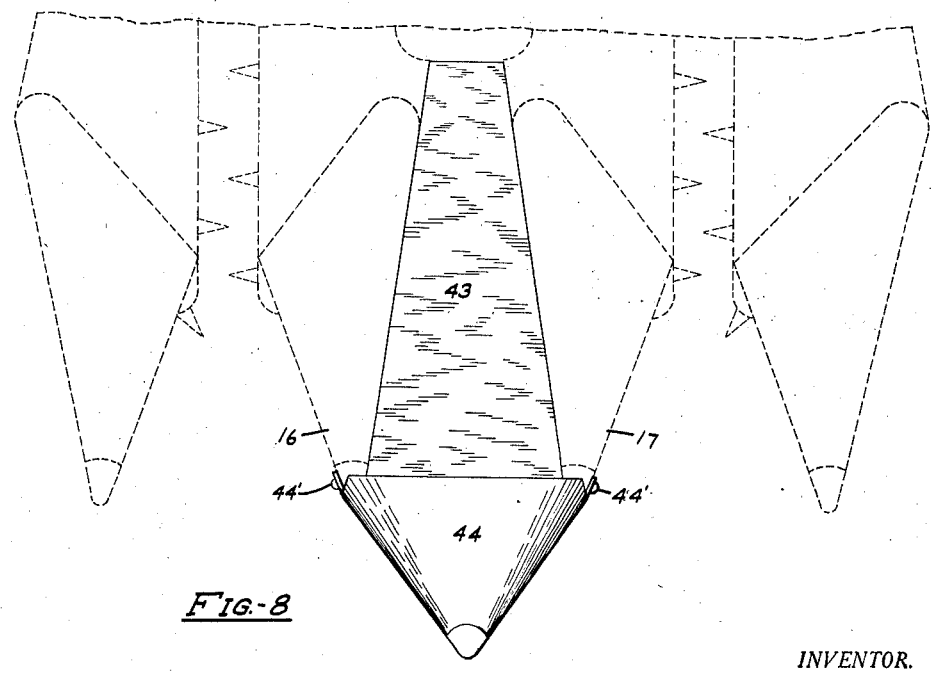
INVENTOR.
NORMAN R. KRAUSE
BY James A. Walsh
ATTORNEY

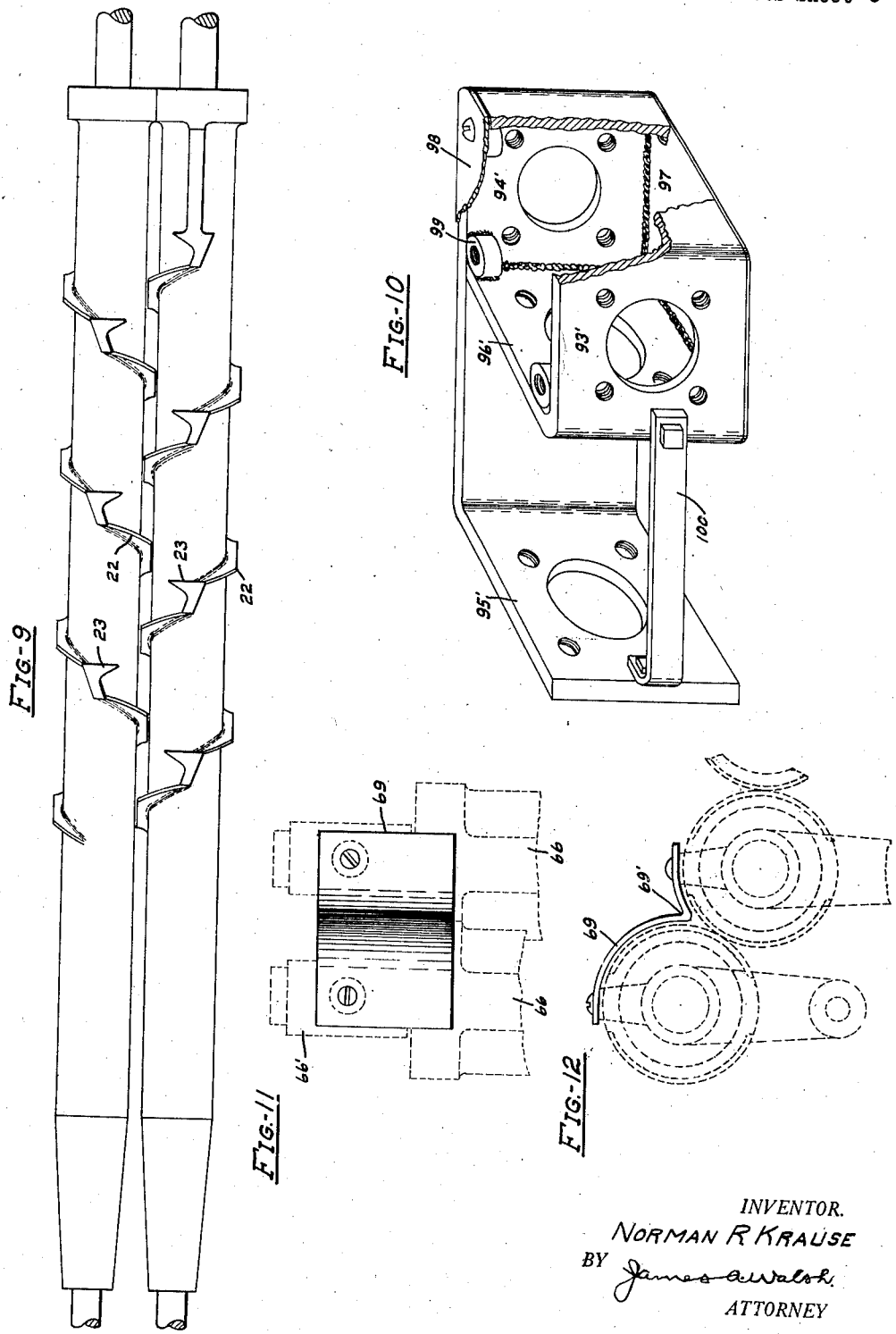

Patented Aug. 15, 1933

1,922,375

UNITED STATES PATENT OFFICE 1,922,375

CORN HARVESTING MACHINE

Norman R. Krause, Racine, Wis., assignor to J. I. Case Company, Racine, Wis., a Corporation Application August 29, 1932. Serial No. 630,817

19 Claims. (Cl. 56—18)

My invention relates to corn harvesting machines of the general character disclosed in the Powell Patent No. 1,785,647, issued December 16, 1930, my object being to improve various features of such machines to increase its efficiency and to refine the manufacture thereof generally, as will hereinafter more fully appear.

In the accompanying drawings, forming part hereof, Figure 1 is a plan view of my improved corn harvester connected to a tractor for drawing and operating the same; Fig. 2, a rear elevation of the machine; Figs. 3 and 4, diagrammatic views of power transmitting mechanisms which I employ; Fig. 5, a perspective of one of the crank axles; Fig. 6, a fragmentary side elevation indicating the range of movement of the frame by means of the crank axles; Fig. 7, a diagrammatic view showing in full and dotted lines the adjustability of the frame and gathering points; Fig. 8, a plan view in fragment showing a shield between the inner gathering points and a hinged center point associated therewith; Fig. 9, a plan view of the snapping rolls; Fig. 10, a perspective of the gear-box intermediate the ends of the power and driven shafts; Fig. 11, a fragmentary plan of a pair of the husking rolls with my improved shield at the outer ends thereof; Fig. 12, a detail sectional view taken on the dotted line 12—12 in Fig. 1; Fig. 13, a detail section through the ear conveyer positioned between the pairs of snapping rolls and taken on the dotted line 13—13 in Fig. 1, and Fig. 14 is a perspective of one of the strippers associated with the conveyer.

In said drawings the numeral 5 indicates the frame of the harvester, to opposite sides of which crank axles 6 are pivotally connected by suitable ears 7 or otherwise, the supporting member 8 of the axle extending forwardly and then turned at right angles to form a spindle 9 for a wheel 10, said axle having associated therewith a hanger 11 connected to a brace or anchor 12, which latter at its upper end is secured to an upright of the frame 5 having a series of holes 13 therein so that when the frame is raised or lowered as indicated in Fig. 6 it may be retained in such adjusted position by said brace when the same is secured by the bolt 14.

Upon frame 5 I mount gathering points, preferably comprising two pairs 15, 16, and 17, 18, the inner points 16, 17, being spaced apart as shown in Fig. 1. These gathering points include shields 15′, 16′, and 17′, 18′, and each pair carries tapered snapping rolls 20, 21. Said rolls are smooth throughout approximately a third of their lower ends, Fig. 9, and each is provided with a spiral web 22 preferably having lugs 23, said webs terminating in parallel relation to the rolls near their upper ends, the rolls 20 including driven shafts 24 having a gear 25 engaging a gear 26 of its companion roll 21 for driving the latter, as shown in Fig. 3. At opposite sides of each pair of snapping rolls I provide gathering chains 28, including fingers, which chains travel about sprockets 29 secured to the points, as 15, Fig. 1, and sprockets 30 secured to the shields, as 15′, the latter sprockets having gears 31 thereon engaging geared shafts 32 the opposite ends of the latter having gears 33 engaging and driven by the gears 26, as clearly shown in the diagrammatic view Fig. 3, it being understood that the upper ends of the several shafts and the gears thereon are suitably mounted in the frame structure 5 which has been omitted from said view for purposes of clearness. The gears 24′ on shafts 24 are engaged and driven by the bevel gears 35 on the shaft 36 which telescopes into a sleeve 37, in the opposite end of which sleeve a shaft section 38 also telescopes, the section 38 having a gear 39 thereon engaging gear 40 on a power shaft 41, all as indicated in said Fig. 3, and in which manner I provide a transverse shaft of yielding character composed of the sections 36, 37, 38. A machine of the character which is the subject hereof is of considerable width, including a large number of actuating parts, and because of hilly and rough land which it traverses in field operations is subjected to frequent and unusual torsional strain. In providing shafts 36, 37, 38, for actuating the snapping rolls, gathering chains and other mechanisms to be hereinafter referred to, an effective degree of flexibility is permitted to prevent distortion of or damage to the parts driven thereby when undue strains occur, in which manner the various gears are maintained in engaged relation and the actuating parts in constant normal operation, as they will not be affected by distortion of the frame permitted by the yielding transverse shaft, while misalignment of the shaft is taken care of by the flexibly connected element 37.

Between the inner points 16, 17, I insert a removable shield 43 preferably composed of sheet metal, and at the lower end thereof a center point 44 is provided which is hinged to said points 16, 17, as at 44′, and extends a considerable distance forwardly of the pairs of gathering points. These devices are readily detached when operating in fields of standing corn in normal condition, but where crops or portions thereof are in a leaning condition and troublesome to strip I install the shield 43 and center point 44, which point, being flexibly mounted and in advance of the gathering points, readily follows ground irregularities and directs the leaning stalks into the entrances between the gathering points to be gathered and the ears picked therefrom by the chains and snapping rolls in the ordinary manner, during which operations the shield 43 prevents stalks from entering between the inner gathering points and becoming clogged therein, which would otherwise occur.

As the gathering points pass astride the stalk rolls the ears are picked as the spiral portions of the rolls reach the stalks and pass down the inclined walls 45 into an elevator positioned between the pairs of points, which comprises endless chains 46 connected by cross-slats 47, and travel about sprockets 48, 48', mounted on shafts 49, 50, the latter being driven by the shaft 36 to which it is connected by a sprocket-and-chain system 51, Fig. 3. The chains 46 pass under and are held in place by guides 52, and the lower run of this endless conveyer comprising the chains and slats is controlled by a tightener 53 and an idler 54, so that with the floor 55 about which it travels said conveyer assumes the position indicated in Figs. 2 and 13, and the chains are thus prevented from contacting with adjacent parts of the machine. The floor 55 is provided with curved ends 56, 57, adapted to be hooked about shafts 49, 50, and in order to stiffen said floor I may draw the same longitudinally by introducing wedging means 58 between the shafts and the hooked ends of the floor. As it is important to keep the elevator chains free from obstructions strippers 59 are attached to the elevator walls 60, these strippers being preferably of the form shown in Fig. 14 comprising a supporting member 61 and a shoe 62 under which the chain readily passes and by which ears and materials are removed from the chains.

The elevator walls 60 terminate in a hood or deflector 64 into which the ears are carried by the conveyer and discharged therefrom into an inclined hopper 65 leading to a combined husking roll unit 66 and feeder conveyer 67 of substantially the character disclosed in the Powell Patents No. 1,622,207, March 22, 1927, and No. 1,810,437, June 16, 1931, the husking unit including a conveyer 68, Fig. 2. In practice I have found it desirable to prevent material from entering between the bearings for the rolls and for which purpose I provide for each pair of rolls a sectional shield 69 of V-shaped formation, Fig. 12, which is placed in overlapping position over the rolls 66 and the bearings 66', while its converged portion 69' is neatly fitted between the rolls, these shields being held in position on the bearings by screws or otherwise. In operation, hard substances in working between the rolls spread them apart slightly, and therefore the shields 69 are made of flexible material so that they will follow the movements of the spreading and closing rolls. The rolls 66 are driven by the shaft 36 through the shaft 70 engaging therewith and with one of the rolls, Fig. 3, which shaft 70 also actuates the lower conveyer 68 and the upper feeder conveyer 67 by a chain-and-sprocket system 71, 72, 73, 74, Fig. 2.

Upon frame 5 I mount a blower 76 actuated by the flexible shaft 36 through the sprocket-and-chain connection 77, which blower discharges its blast between the upper and lower runs of conveyer 68 for winnowing shelled corn, the trash being forced by the fan blast to fall from the machine, while the cleaned shelled corn is conveyed into a wagon elevator 80, all in a well known manner.

A shaft 81 adjacent conveyer 68 is connected to and driven by the power shaft 41 through a sprocket-and-chain connection 82, 83, 84, Figs. 4 and 2, and at its outer end is provided with a gear 85 adapted to be engaged by a gear 86 on the elevator 80 for actuating the endless carrier 80' of said elevator, Fig. 1.

Considerable difficulty is experienced when transporting a corn harvester because of the fixed projecting wagon elevator on the machine, which must be removed to permit passage through gateways and the like, and this I overcome by hinging the elevator to the machine, as at 87, so that it may be readily swung over the top of the machine as indicated by the dotted lines in Fig. 2, and the objection referred to thus overcome. As the elevator carries gear 86 it readily disengages from gear 85 when said elevator is adjusted as described.

As will be understood, power is transmitted from the tractor to the actuating mechanisms of the machine by a shaft, as 41, connected to the tractor and its end mounted in a gear-box 90, which latter is of novel construction and arrangement for the purpose, and said shaft is further supported on a drawbar 91, as at 92, the drawbar including a lever (not shown) connected to the machine for rocking the latter on its crank axles to raise and lower the gathering points, which is a common and well known feature on machines of the character described. The walls of the gear-box are formed from a single piece of metal to include bearings 93, 94, for the section 38 of the shaft 36, and other bearings 95, 96, for the power shaft 41, the bearing-walls 93', 94' and 96' enclosing the power shaft gear 40 and the driven shaft gear 39, Fig. 3. The walls 93', 94', 96', are provided with a bottom 97 to constitute a compartment for encasing and protecting the gears 39, 40, and the box is covered by a top piece 98 secured to lugs 99 in the compartment, the wall 95' and compartment being connected and braced by a rod 100. The gear-box described is strong and durable for its purpose, and, as indicated in Fig. 10, its walls, bottom and lugs are welded together so that there are no projections on its outer surface to interfere with its proper fitting in the limited space provided therefor in the machine construction.

From the foregoing description and the drawings it will be apparent that I have improved various features of the corn harvester disclosed in the patents referred to and provide a machine the parts of which may be readily assembled and its efficiency materially increased.

I claim as my invention:

1. In a corn harvesting machine, a frame, means supported by the frame for gathering stalks, means for picking ears from the stalks, a crank axle pivotally mounted on the frame and having a spindle at its outer end, a hanger on the axle, and an anchor connecting the hanger to the frame for retaining the axle in adjusted positions.

2. In a corn harvesting machine, a frame, means supported by the frame for gathering stalks, means for picking ears from the stalks, a crank axle pivotally mounted on the frame and having a spindle at its outer end, and an anchor connected to the axle and to the frame for retaining the axle in adjusted positions when the machine has been raised and lowered.

3. In a corn harvesting machine, a frame, means supported by the frame for gathering stalks, means for picking ears from the stalks, a crank axle, means for pivotally mounting the axle on the frame, an anchor connecting the axle to the frame, and means for detachably securing the anchor to the frame whereby said axle may be adjusted and retained in different positions.

4. In a corn harvesting machine, a frame, pairs of gathering points mounted on the frame, means mounted on the points for picking ears from stalks, and a center gathering point pivotally connected to the inner members of said pairs of gathering points.

5. In a corn harvesting machine, a frame, pairs of gathering points mounted on the frame the inner members of which are spaced apart, means mounted on the points for picking ears from stalks, a removable shield insertible in said space to prevent the entrance of stalks therein, and a center gathering point pivotally connected to the inner members of said pairs of gathering points for directing leaning stalks between said pairs.

6. The combination, in a corn harvesting machine, of a frame, gathering points thereon, snapping rolls carried by said points, gathering chains mounted on said points, an interengaging gear system associated with the rolls and chains for actuating the same, a flexible shaft arranged transversely of the machine and engaging said gear system for driving the same, and a power shaft engaging the flexible shaft and connected to a tractor for driving the flexible shaft.

7. The combination, in a corn harvesting machine, of a frame, gathering points thereon, snapping rolls carried by said points, gathering chains mounted on said points, an interengaging gear system associated with the rolls and chains for actuating the same, a flexible shaft arranged transversely of the machine and engaging said gear system for driving the same, an endless conveyer on the frame, means connecting the shaft and conveyer for actuating the latter, and a power shaft engaging the flexible shaft and connected to a tractor for driving the flexible shaft to actuate said rolls, chains and conveyer.

8. In a corn harvesting machine, the combination, of a frame, gathering points on the frame, snapping rolls carried by said points, gathering chains mounted on said points, an interengaging gear system associated with the rolls and chains for actuating the same, a flexible shaft arranged transversely of the machine and engaging said gear system for driving the same, an endless conveyer on the frame, means connecting the shaft and conveyer for actuating the latter, a husking roll unit supported by the frame, means connecting the shaft and husking unit to actuate the latter, and a power shaft engaging the flexible shaft and a tractor for driving the flexible shaft to actuate said rolls, chains, conveyer and husking unit simultaneously.

9. In a corn harvesting machine, the combination of a frame, gathering points on the frame, snapping rolls carried by said points, gathering chains mounted on said points, an interengaging gear system associated with the rolls and chains for actuating the same, a flexible shaft mounted transversely of the machine and engaging said gear system for driving the same, an endless conveyer on the frame, means connecting the flexible shaft and conveyer for actuating the latter, a husking roll unit supported by the frame, means connecting the flexible shaft and husking unit to actuate the latter, a blower mounted on the frame and discharging its blast beneath the husking unit for winnowing material, means connecting the flexible shaft and blower for actuating the latter, and a power shaft connected to a tractor and to said flexible shaft for driving the flexible shaft to simultaneously actuate said rolls, chains, conveyer, husking unit and blower.

10. In a corn harvesting machine, the combination of a frame, gathering points on the frame, snapping rolls on said points, gathering chains mounted on said points, an interengaging gear system associated with the rolls and chains for actuating the same, a flexible shaft mounted transversely of the machine and engaging said gear system for driving the same, an endless conveyer on the frame, means connecting the flexible shaft and conveyer for actuating the latter, a husking roll unit supported by the frame, means connecting the flexible shaft and husking unit to actuate the latter, a power shaft connected to a tractor and to said flexible shaft for driving the shaft to simultaneously actuate said rolls, chains, conveyer and husking unit, a wagon elevator associated with said husking unit for removing material from the latter, and means connecting the power shaft and elevator for actuating the latter.

11. In a corn harvesting machine, the combination of a frame, gathering points on the frame, snapping rolls carried by said points, gathering chains mounted on said points, means for actuating said chains and rolls to gather stalks and pick ears therefrom, a husking roll unit for removing husks from the ears, a conveyer adjacent the points for conveying material therefrom to the husking unit, and a wagon loader cooperating with the husking unit and pivotally connected to the frame for positioning the loader across the machine.

12. In a corn harvesting machine, the combination of a frame, means mounted on the frame for gathering stalks and stripping the ears therefrom, a flexible shaft for actuating said gathering and stripping means comprising a sleeve and end sections telescopically mounted therein, and a power shaft connected to a tractor and to said flexible shaft for driving the latter.

13. In a corn harvesting machine, the combination of a frame, means mounted on the frame for gathering stalks and stripping ears therefrom, a shaft for actuating said gathering and stripping means, a power shaft connected to a tractor and to said actuating shaft for driving the latter, and a gear-box enclosing the ends of said shafts said box comprising walls composed of a single piece of material constituting bearings for the engaging ends of the shafts.

14. In a corn harvesting machine, the combination of a frame, means mounted on the frame for gathering stalks and stripping ears therefrom, a shaft for actuating said gathering and stripping means, a power shaft connected to a tractor and to said actuating shaft for driving the latter, and a gear-box enclosing and supporting the ends of said shafts said box comprising walls constituting bearings for the engaging ends of said shafts and a bottom and cover for encasing the ends of the shafts.

15. In a corn harvesting machine, the combination of a frame, gathering points supported by the frame, snapping rolls mounted on the points said rolls having a smooth surface for approximately one-third of their lower portion and a spiral stripping web embodying lugs encircling the remainder of each roll, means for rotating the rolls to strip ears from stalks, and a power shaft connected to a tractor and to said rotating means for rotating the rolls.

16. In a corn harvesting machine, the combination of a frame, gathering points on the frame for gathering stalks and stripping ears therefrom, an endless conveyer between the points, means for enclosing the conveyer, a floor between the upper and lower runs of the conveyer, guides for maintaining the conveyer in close relation to the floor, means in the enclosing means for removing material from the sides of the conveyer, and means associated with the conveyer for stiffening said floor.

17. In a corn harvesting machine, the combination of a frame, gathering points on the frame for gathering stalks and stripping ears therefrom, an endless conveyer between the points for conveying material therefrom, means for actuating the gathering and stripping mechanisms on the points, and means associated with the conveyer for removing material from the sides thereof.

18. In a corn harvesting machine, the combination of a frame, gathering points supported by the frame, snapping rolls supported on the points said rolls having a smooth surface at their lower portions and a spiral stripping web encircling the remaining portion of each roll and terminating in parallel relation to the roll, means for rotating the rolls to strip ears from stalks, and a power shaft connected to a tractor and to said latter means for rotating the rolls.

19. In a corn harvesting machine, the combination of a frame, gathering points supported by the frame, snapping rolls mounted on the points said rolls having tapered lower ends and a smooth surface for approximately one-third of their lower portion and a spiral stripping web encircling the remaining portion of each roll and terminating in parallel relation to the roll, means for rotating the rolls to strip ears from stalks, and a power shaft connected to a tractor and to said latter means for rotating the rolls.

NORMAN R. KRAUSE.